A. F. CHERRY.
Screw-Cutting Lathe.
No. 207,852.    Patented Sept. 10, 1878.
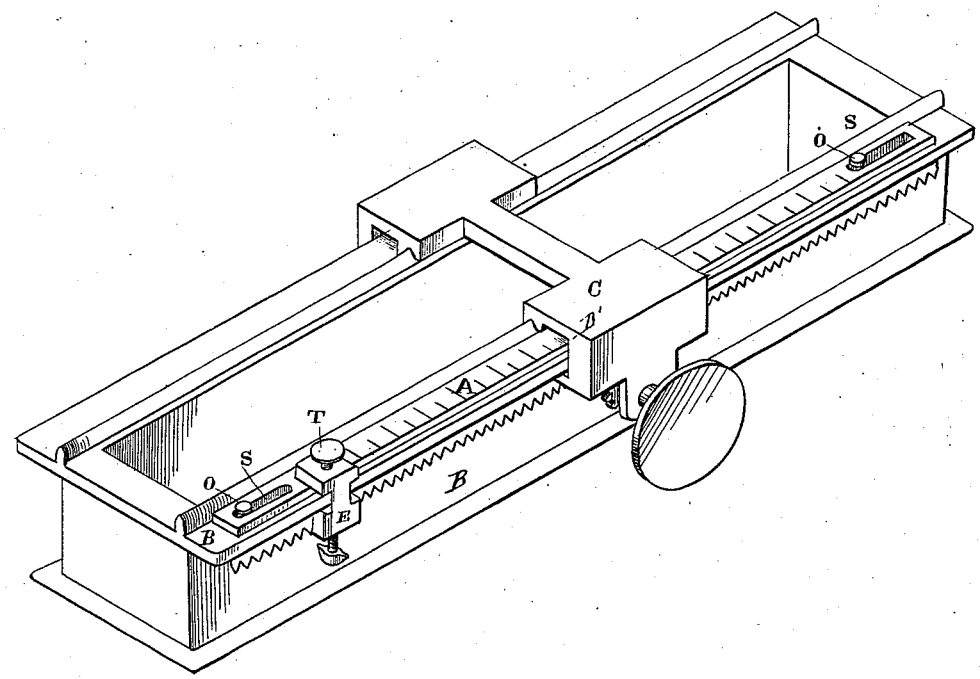

UNITED STATES PATENT OFFICE.

ALPHEUS F. CHERRY, OF ALBANY, OREGON.

IMPROVEMENT IN SCREW-CUTTING LATHES.

Specification forming part of Letters Patent No. 207,852, dated September 10, 1878; application filed February 26, 1878.

*To all whom it may concern:*

Be it known that I, A. F. CHERRY, of Albany, county of Linn, and State of Oregon, have invented an Attachment for Screw-Cutting Lathes; and I do hereby declare the following to be a full, clear, and exact description thereof, reference being had to the accompanying drawings, in which the figure is a perspective view of a portion of the bed of the lathe, showing my attachment.

My invention relates to an attachment for screw-cutting lathes, and a novel mode of employing the same, by which I am enabled to gage the screw-threads to be cut, and also to determine the point of commencement for every fresh cut of any screw-thread required, and by which I am enabled to do away with the necessity of running the lathe backward after each cut has been made, and thus gaging every fresh cut of the screw correctly, to make a perfect and regular thread, as desired.

Referring to the accompanying drawings, A is a bar of wood or metal, secured by means of slot-bolts to the bed B of an ordinary screw-cutting lathe, and it is to be fastened to the shears, preferably on the top, and so that the saddle C, carrying the tool-post, will pass over it readily, and allow any marks or gradations on the face of the bar A to be seen at the edges or sides of said saddle-plate. This bar has suitable slots S S cut near each end, and it is fastened to the shears or bed B by means of flat-head bolts O O. These bolts may be slackened, and the bar A may then be moved endwise to the extent of the slots S S.

The bar A is to be marked or graduated in the following manner: First tighten the bolts O O so that the said bar will not slip or move; then move the saddle C as near to the headstock of the lathe as possible, and close the ordinary screw-nut on the guide or leading screw, (not represented, but which is a part of every screw-cutting lathe;) then mark said guide-screw at the bearing or journal box, so that the mark can be seen when a revolution has been made by the screw. Mark the bar A near the head end, at the inside edge of the saddle-plate, as at D'; turn the screw one revolution, so as to move the saddle-plate C toward the tail-stock, and mark the bar A for the second mark, and so on. Continue marking the bar at every revolution of the leading-screw to the extent of length required. The said bar A is to be numbered at every inch-mark. Upon the edge of the bed B is a clamp, E, having a projection with a gib overhanging the bar A. This gib is pressed by a thumb-screw, T, against the bar A, to prevent shifting at any time.

The operation of a screw-cutting lathe having my invention attached will be as follows: The lathe having been started, in the usual manner, for the purpose of cutting a definite number of threads to the inch, as ordinarily, and after the tool has traversed the first cut of the screw to the distance required, stop the lathe and loosen the thumb-screw T; then move the bar A so as to bring one of the inch-marks of the said bar close to or even with the inner edge of the saddle-plate C, as at D'; then clamp the bar A by tightening the thumb-screw T. It will be necessary to open the nut on the guide or leading screw, which is attached to every screw-cutting lathe; then move the saddle-plate C back by the hand until the cutting-tool is at the point it started from, and the inner edge of the saddle-plate C must be even with the inch or gradation mark at the end or point of commencement in cutting a screw. It will then be necessary to close the aforesaid screw-nut of the leading-screw; then start the lathe, and the tool will travel in the same mark made by the first cut, marking the same number of threads to the inch, the operation being repeated until the required screw is finished.

By this means it will be seen that the lathe may be stopped at any point, and the saddle-plate can be moved back by hand to every or any gradation-mark of the bar A, and the cutting-tool will be found to travel in the cut made previously.

When fractional threads to the inch are to be cut, a lathe having my attachment will be operated in a similar manner as above described, and the bar A must be adjusted as before. For instance, take nine and two-fifteenths threads to the inch; the denominator of the fraction only is considered. Thus the lathe will be stopped every fifteen inches along the bar A, and the saddle-plate, carrying the tool-post and cutting-tool, is shoved back to the point of commencing the cut. All nuts being secure, the lathe is started, and the cutting-tool will operate correctly.

Thus it will be seen that fractional threads of any denomination, as well as all other threads, may be cut upon any screw-cutting lathe that has my graduated bar A attached.

It will also be seen that greater rapidity will be attained by the use of my attachment when cutting a screw-thread than by the usual method of operating a screw-cutting lathe.

Having thus described my invention, what I claim as new, and desire to secure by Letters Patent, is—

In combination with a screw-cutting lathe and saddle, C, the bar A, secured to the bed B by means of bolts passing through slots S, said bar being graduated, substantially as shown, and for the purposes herein described.

In witness whereof I have hereunto set my hand and seal.

ALPHEUS F. CHERRY. [L. S.]

Witnesses:
 DAVID FROMEN,
 J. J. WHITNEY.